(12) United States Patent
Choudhury et al.

(10) Patent No.: US 10,211,466 B2
(45) Date of Patent: Feb. 19, 2019

(54) INTERFACE SEAL FOR A FUEL CARTRIDGE

(71) Applicant: INTELLIGENT ENERGY LIMITED, Loughborough (GB)

(72) Inventors: Monjur Choudhury, Loughborough (GB); Simon Payne, Loughborough (GB)

(73) Assignee: INTELLIGENT ENERGY LIMITED, Loughborough (GB)

( * ) Notice: Subject to any disclaimer, the term of this patent is extended or adjusted under 35 U.S.C. 154(b) by 398 days.

(21) Appl. No.: 14/910,648

(22) PCT Filed: Aug. 6, 2014

(86) PCT No.: PCT/GB2014/052415
§ 371 (c)(1),
(2) Date: Feb. 5, 2016

(87) PCT Pub. No.: WO2015/019092
PCT Pub. Date: Feb. 12, 2015

(65) Prior Publication Data
US 2016/0181629 A1      Jun. 23, 2016

(30) Foreign Application Priority Data

Aug. 7, 2013    (GB) .................................. 1314139.5

(51) Int. Cl.
*H01M 14/00*    (2006.01)
*H01M 8/0273*   (2016.01)
(Continued)

(52) U.S. Cl.
CPC ......... *H01M 8/0273* (2013.01); *F16J 15/022* (2013.01); *F16J 15/06* (2013.01);
(Continued)

(58) Field of Classification Search
CPC .. H01M 8/0273; H01M 8/04; H01M 8/04208; H01M 2/08
See application file for complete search history.

(56) References Cited

U.S. PATENT DOCUMENTS

| 5,267,740 A | 12/1993 | Stritzke |
| 5,829,966 A | 11/1998 | Stoner |

(Continued)

FOREIGN PATENT DOCUMENTS

| CN | 201141618 Y | 10/2008 |
| CN | 101326664 A | 12/2008 |

(Continued)

OTHER PUBLICATIONS

International Patent Application No. PCT/GB2014/052415; Int'l Preliminary Report on Patentability; dated Feb. 9, 2016; 7 pages.

(Continued)

*Primary Examiner* — Jane J Rhee
(74) *Attorney, Agent, or Firm* — Baker & Hostetler LLP; Mark H. Krietzman (57) ABSTRACT

A resilient sealing member (27) has a first face (40) and a second face (41) and an aperture (42) extending between the first face and the second face. At least two, preferably three or more, circumferential ridges (43, 44, 45) surround the aperture on the first face. Channels (46, 47) may be disposed between each adjacent pair of circumferential ridges and a flat seal may be provided on the first face, peripheral to the circumferential ridges. The flat seal may occupy a different plane than the plane occupied by apexes of the circumferential ridges. The resilient sealing member may be incorporated into interface seal assembly comprising a rigid frame (26) onto which it is molded. The rigid frame may comprise a printed circuit board (25). The interface seal assembly (Continued)

allows for an easily interchangeable seal on a refillable fuel cartridge (1) for a fuel cell apparatus.

2 Claims, 4 Drawing Sheets

(51) Int. Cl.
| | | |
|---|---|---|
| *F16J 15/06* | (2006.01) | |
| *F16J 15/12* | (2006.01) | |
| *H01M 8/04082* | (2016.01) | |
| *F16J 15/02* | (2006.01) | |
| *F16J 15/10* | (2006.01) | |
| *H01M 2/08* | (2006.01) | |
| *H01M 8/04* | (2016.01) | |

(52) U.S. Cl.
CPC ............. *F16J 15/104* (2013.01); *F16J 15/12* (2013.01); *H01M 2/08* (2013.01); *H01M 8/04* (2013.01); *H01M 8/04208* (2013.01)

(56) References Cited

U.S. PATENT DOCUMENTS

| | | |
|---|---|---|
| 5,922,158 A | 7/1999 | Culp et al. |
| 6,102,410 A | 8/2000 | Hotta |
| 6,260,854 B1 | 7/2001 | Lemon |
| 2004/0040913 A1 | 3/2004 | Oberlander |
| 2004/0215407 A1* | 10/2004 | Thielman ................ G01F 17/00 702/55 |
| 2007/0141450 A1 | 6/2007 | Yang et al. |
| 2010/0225110 A1 | 9/2010 | Christie et al. |
| 2010/0253010 A1 | 10/2010 | Tohdoh et al. |
| 2011/0200895 A1 | 8/2011 | Sinha et al. |

FOREIGN PATENT DOCUMENTS

| | | |
|---|---|---|
| EP | 1827071 A1 | 8/2007 |
| EP | 2226533 A1 | 9/2010 |
| EP | 2472159 A1 | 7/2012 |
| FR | 2685943 A1 | 7/1993 |
| GB | 1533404 A | 11/1978 |
| GB | 2072277 A | 9/1981 |
| JP | 2007-123293 A | 5/2007 |
| JP | 2008-181764 A | 8/2008 |
| JP | 2012-021640 A | 2/2012 |
| WO | WO 2002/001659 A1 | 1/2002 |
| WO | WO 2007/049339 A1 | 5/2007 |

OTHER PUBLICATIONS

Great Britain Patent Application No. 1314139.5; Search Report; dated Feb. 12, 2014; 4 pages.

* cited by examiner

INTERFACE SEAL FOR A FUEL CARTRIDGE

CROSS-REFERENCE TO RELATED APPLICATIONS

This application is a National Stage of International Patent Application No. PCT/GB2014/052415, filed Aug. 6, 2014, and claims priority to foreign application GB 1314139.5, filed Aug. 7, 2013, the contents of which are incorporated herein by reference in their entirety.

The present invention relates to sealing interfaces. In particular, though not exclusively, the sealing interfaces are applicable to fuel cartridges, such as those used for the production and/or storage of gaseous fuels for electrochemical fuel cell apparatus.

BACKGROUND

Electrochemical fuel cells are being developed for many uses, including as compact, portable sources of electrical power for portable electronic equipment such as laptop computers, tablet computers, mobile telephones etc. The electrochemical fuel cells provide electrical power from the reaction of fuel and oxidant, typically using hydrogen as a fuel source and air as the oxidant source. It is convenient to provide the fuel source, such as hydrogen, to the fuel cell apparatus in the form of a reusable fuel cartridge which can be readily coupled to and decoupled from the fuel cell system.

A fuel cartridge must generally be provided with a sealing interface surrounding a fuel exit port such that the sealing interface can seal against a receiving part of a fuel cell apparatus when it is connected thereto, thereby providing a gas tight seal with the fuel cell apparatus. A potential problem can exist in that a sealing surface of the sealing interface may be exposed to damage during normal or careless use of the cartridge during many connection/disconnection cycles. A further potential problem exists in that when the fuel cartridge is not connected to a fuel cell apparatus, the sealing surface may be exposed to dirt, debris and damage, e.g. when carried in an unprotected state by a user. The presence of dirt or debris on the sealing surface or damage to the sealing surface can significantly compromise the sealing ability of the sealing surface.

DISCLOSURE

It is an object of the present invention to provide an improved sealing surface for a fluid-tight interface.

According to one aspect, the invention provides a resilient sealing member comprising:
  a first face and a second face and an aperture extending between the first face and the second face;
  at least two circumferential ridges surrounding the aperture on the first face.

The resilient sealing member may comprise at least three of said circumferential ridges surrounding the aperture, including an inner circumferential ridge and at least two successively larger outer circumferential ridges, each being circumambient to the inner circumferential ridge. The resilient sealing member may further comprise at least two circumferential ridges surrounding the aperture on the second face. A channel may be disposed between each adjacent pair of circumferential ridges. A flat seal may be disposed on the first face, peripheral to the circumferential ridges. The flat seal may occupy a different plane than the plane occupied by apexes of the circumferential ridges. The at least two circumferential ridges may occupy different planes. The aperture may be tapered.

According to another aspect, the invention provides a resilient sealing member comprising:
  a first face and a second face and an aperture extending between the first face and the second face;
  at least one circumferential ridge surrounding the aperture on the first face, and a planar sealing surface surrounding the at least one circumferential ridge, the planar sealing surface defining a plane different than a plane defined by the apex of the at least one circumferential ridge.

The resilient sealing member may comprise at least two of said circumferential ridges surrounding the aperture, including an inner circumferential ridge and at least one larger outer circumferential ridge, each outer circumferential ridge being circumambient to the inner circumferential ridge. The resilient sealing member may further comprise at least two circumferential ridges surrounding the aperture on the second face. The resilient sealing member may include a channel disposed between each adjacent pair of circumferential ridges. The aperture may be tapered.

According to another aspect, the invention provides an interface seal assembly comprising a resilient sealing member as described above and a rigid frame into which it is moulded. The rigid frame may include one or more sprues, the sealing member being engaged with the rigid frame by retention of the resilient material within the one or more sprues. The rigid frame may include a printed circuit board. The rigid frame may include one or more electrical contact terminals. The first face of the resilient sealing member may project above an upper face of the rigid frame.

According to another aspect, the invention provides a fuel cartridge comprising the interface seal assembly as defined above. The fuel cartridge may have a fluid fuel source contained within the cartridge and a fuel flow path extending therefrom to an engagement surface of the cartridge, the fuel flow path extending to and through the aperture in the resilient sealing member, the first face of the resilient sealing member forming a part of the engagement surface of the cartridge. The engagement surface may further include a rigid engagement plate surrounding the resilient sealing member. A portion of the engagement surface defined by the resilient sealing member may be recessed below a portion of the engagement surface defined by the rigid engagement plate. The fuel cartridge may further include a pair of valves disposed within the fuel flow path, the valves being configured such that the fuel flow path is blocked unless both valves are actuated. The valves may be mechanically actuable from the engagement surface of the cartridge. The valves may be poppet valves both configured to be axially displaceable within chambers so as to enable fluid flow from the fluid fuel source in the cartridge to the aperture in the resilient sealing member, through a bridge chamber extending between poppet valve chambers.

According to another aspect, the invention provides a fuel cell apparatus comprising an interface seal assembly as defined above.

According to another aspect, the invention provides a method of reconditioning a fuel cartridge,
  the fuel cartridge having a body and an interface seal assembly comprising a resilient sealing member moulded onto a rigid frame, the resilient sealing assembly having a first face and a second face and an aperture extending between the first face and the second face, the aperture forming part of a fuel flow path from the cartridge to an external interface defined by the first face, and the second face defining a seal to an internal part of the fuel cartridge, the method comprising the steps of:

removing the interface seal assembly by detachment of the rigid frame from the cartridge body;

attaching a new interface seal assembly to the cartridge body, thereby renewing the seals defined by the first face and the second face of the resilient sealing member;

replenishing a fuel source within the fuel cartridge.

The rigid frame may include a circuit board component having electrical contacts thereon, wherein the step of removing the interface seal assembly includes simultaneous removal of electrical contacts coupled thereto and the step of attaching a new interface seal assembly includes simultaneously attaching new electrical contacts.

DRAWINGS

Embodiments of the present invention will now be described by way of example and with reference to the accompanying drawings in which.

FURTHER DISCLOSURE

Throughout the present specification, the descriptors relating to relative orientation and position, such as "top", "bottom", "upper", "lower", "horizontal", "vertical", "left", "right", "up", "down", "front", "back", as well as any adjective and adverb derivatives thereof, are used in the sense of the orientation of components as presented in the drawings.

However, such descriptors are not intended to be in any way limiting to an intended use of the described or claimed invention.

Figure 1:
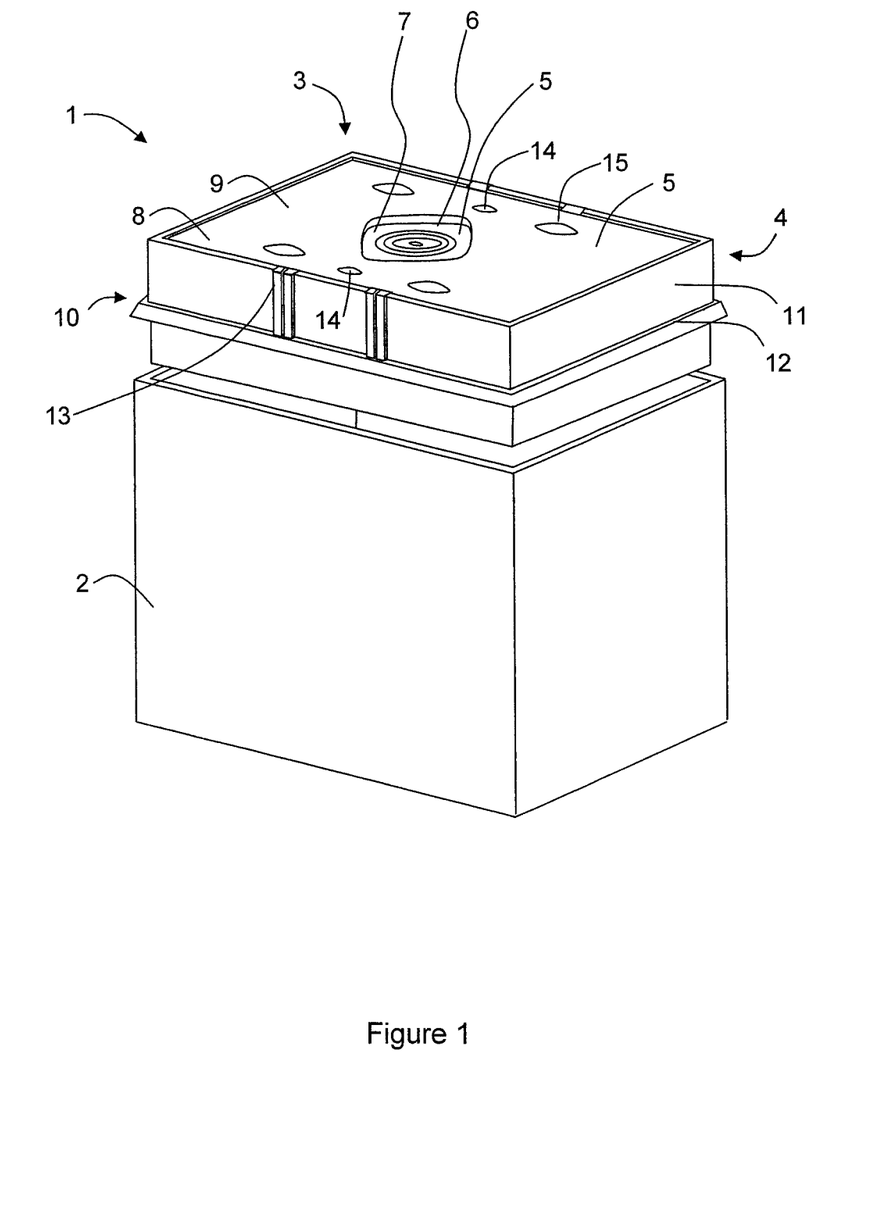
FIG. 1 shows a schematic perspective view of a fuel cartridge incorporating an interface seal assembly, with the cartridge body shown separated from the cartridge header.

FIG. 1 shows a fuel cartridge 1 suitable for the production and/or storage of fluid fuel for use with a fuel cell apparatus. The fuel cartridge 1 has a cartridge body 2 and a cartridge header 3. The cartridge body 2 may include any suitable type of hydrogen generator or hydrogen store. Examples include refillable hydrogen stores such those using metal hydrides or other hydrogen absorption media as hydrogen reservoirs, or hydrogen generators such as those using alkali metal silicides and water to generate hydrogen on demand by reaction. However, any suitable fluid fuel source may be considered, especially gaseous fuel sources which can be used to supply fuel cells.

The cartridge header 3 has an upper surface 4 suitable for engagement with a fuel cell apparatus (not shown). The upper surface 4 includes an engagement surface 5 which provides for both mechanical and fluid sealing engagement with a fuel cell apparatus. The engagement surface 5 includes an outer (exposed) face 6 of a resilient sealing member 7 and an outer face 8 of a rigid engagement plate 9. The rigid engagement plate 9 is preferably formed from a suitable metal, and more preferably from a metal highly conducting of magnetic flux, e.g. a ferrous material. The rigid engagement plate 9 may be secured to the cartridge header 3 by way of screws or other fixing components using screw holes 15.

The upper surface 4 may also include a profiled portion 10 including a sidewall 11 and a shoulder 12 to provide guidance and positioning when engaging the cartridge with a fuel cell apparatus. The upper surface 4 may also include a set of electrical contact terminals 13 for electrical communication with electronic components within the cartridge, if required. Such electronic components may include memory for storing cartridge identification data, filling data and usage data. In other cartridge types, the electronic components may include control components for operating internal functionality of the cartridge such as valves and actuators.

In the present example, however, the fuel cartridge 1 has poppet valves operable mechanically from the upper surface 4 of the cartridge, located in apertures 14 and electrically operated actuators and valves are not required.

Figure 2:
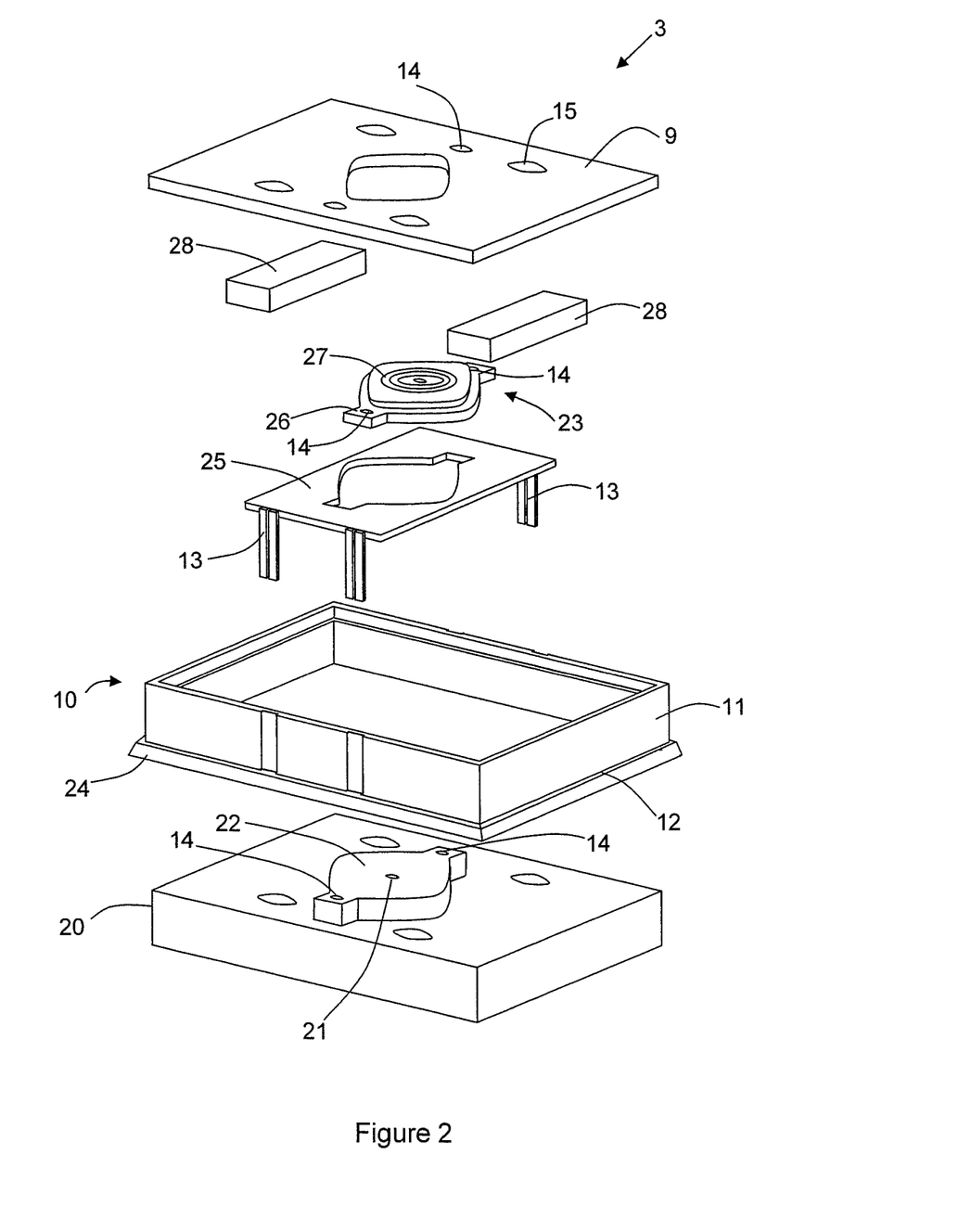
FIG. 2 shows a schematic perspective exploded view of the cartridge header of FIG. 1.

FIG. 2 shows the cartridge header 3 in greater detail, with selected components in exploded form. The cartridge header 3 comprises an upper manifold 20 defining poppet valve apertures 14, a port 21 serving as a fuel flow path extending from the cartridge body 2 up to a support platform 22. The support platform 22 receives and supports an interface seal assembly 23. The upper manifold 20 may be fabricated from a hard wearing material such as aluminium. An interface cap 24 provides the profiled portion 10, including sidewall 11 and shoulder 12 of the header 3. The interface cap may be fabricated from rigid plastics materials.

A printed circuit board 25 is coupled to, and retains, the electrical contact terminals 13, and may include other electrical components such as a memory chip integrated into it. The printed circuit board 25 has a central cut-out into which is received the interface seal assembly 23. The interface seal assembly 23 includes a rigid frame 26 having poppet valve apertures 14 and a resilient sealing member 27 to be described in greater detail later. The interface seal assembly 23 can, if desired, be integrally formed into the printed circuit board 25 as a unitary structure.

A pair of magnets 28 may be disposed beneath the rigid engagement plate 9 to serve as a retention mechanism when the cartridge 1 is coupled to a fuel cell apparatus or other fuel consuming apparatus. In this case, the rigid engagement plate 9 would be fabricated from a suitable material to allow passage of magnetic flux to an adjacent component on the fuel consuming apparatus. Alternatively, any other suitable retention mechanism may be used, e.g. a mechanical latching arrangement or friction fit.

Figure 4:
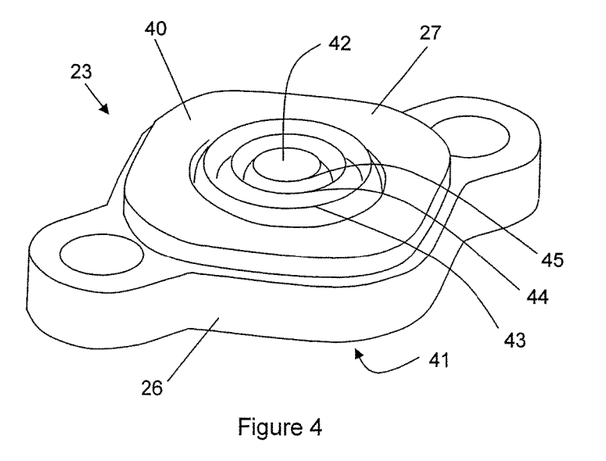
FIG. 4 shows a schematic perspective view of the interface seal assembly of the cartridge header of FIGS. 1 to 3.
Figure 5:
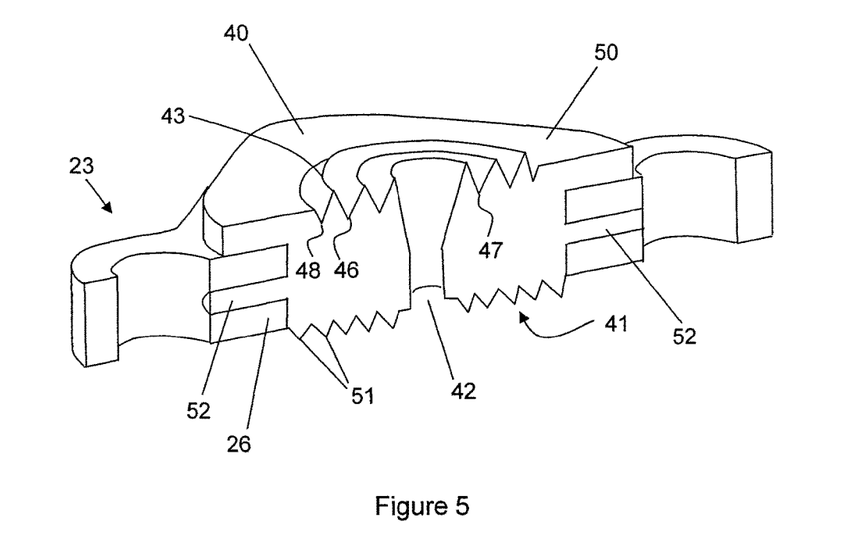
FIG. 5 shows a schematic cross-sectional view of the interface seal assembly of FIG. 4.

As shown in greater detail in FIGS. 4 and 5, the resilient sealing member 27 (of which a portion is shown at 7 in FIG. 1) of the interface seal assembly 23 has an upper face 40 (which may be referred to as a first face or an outer/external face) and a lower face 41 (which may be referred to as a second face or inner/internal face). An aperture 42 extends between the upper face 40 and the lower face 41. The aperture 42 is preferably tapered, e.g. to have a frusto-conical shape, and provides a fuel flow path through the resilient sealing member 27. The upper face 40 is an external face in the sense that the upper face provides a sealing face to an entity external to the cartridge 1, such as a fuel cell apparatus or other fuel consuming apparatus. The lower face 41 is an internal face in the sense that it provides a sealing face to other components within the fuel cartridge 1. The upper face 40 of the resilient sealing member 27 preferably projects above the rigid frame 26.

The upper face 40 of the resilient sealing member 27 defines a flat profile region 50 and three circumferential ridges 43, 44, 45 which extend circumferentially around the aperture 42 to surround it in the plane of the sealing member 27. Between each adjacent pair of ridges 43, 44, 45 is a channel 46, 47. There may also be a channel 48 defined between an outermost circumferential ridge 43 and the flat profile region 50. The channels 46, 47, 48 may have a depth greater than the plane defined by the surface of the flat profile region 50, as shown.

The lower face 41 of the resilient sealing member 27 may also define a set of circumferential ridges 51 extending circumferentially around the aperture 42. The circumferential ridges 51 may underlie the circumferential ridges 43, 44, 45 or they may be offset. The number of circumferential ridges 43, 44, 45, 51 defined in the upper and lower faces 40, 41 may be different to that shown in the figures.

As best seen in FIG. 5, the resilient sealing member 27 is preferably overmoulded onto the rigid frame 26 and preferably sprues 52 in the rigid frame 26 retain injection moulded material of the resilient sealing member 27 to assist in retaining the resilient sealing member 27 in place.

Figure 3:
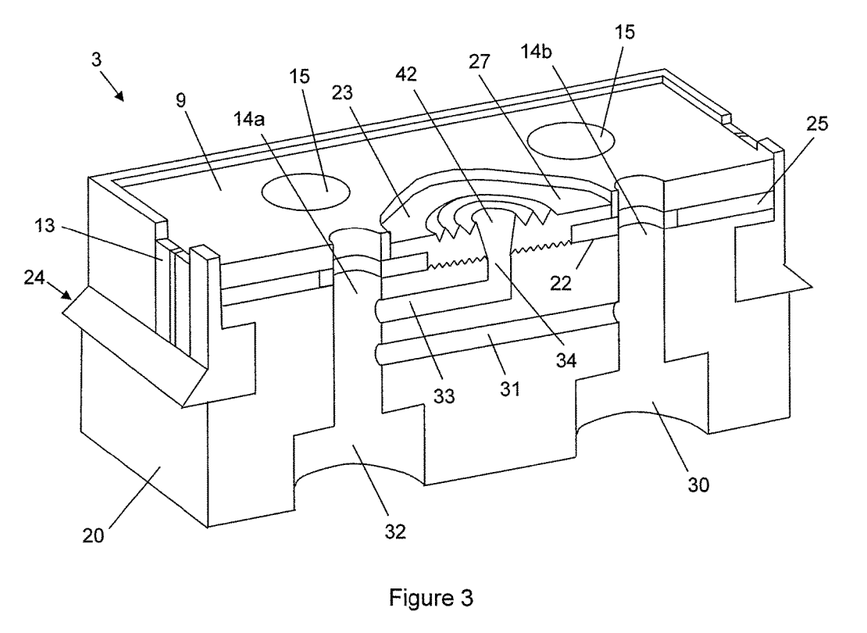
FIG. 3 shows a schematic cross-sectional view of the cartridge header of FIG. 1.

A cross-section of the assembled cartridge header 3 is shown in FIG. 3. The upper manifold 20 defines poppet valve apertures 14a, 14b leading to a fluid flow path defined by chambers 30, 31, 32, 33, 34 and poppet valves (not shown). Fluid fuel from the cartridge body 2 passes up chamber 30 where it is admitted into bridge chamber 31 only when the poppet valve in aperture 14b is actuated (e.g. depressed into the cartridge header 3), otherwise it is blocked. Fluid fuel passes along bridge chamber 31 to chamber 32, where it is blocked unless the poppet valve in aperture 14a is actuated (e.g. depressed into the cartridge header 3). If the poppet valve in aperture 14a is actuated, fluid fuel can flow from chamber 31, via chamber 32, to bridge chamber 33 and from there out through seal aperture 42 via chamber 34. Thus, in a general aspect, this arrangement exemplifies poppet valves which are both configured to be axially displaceable within chambers 14a, 14b, 30, 32 so as to enable fluid flow from the fluid fuel source in the cartridge to the aperture 42 in the resilient sealing member 27, through a bridge chamber 31 extending between the poppet valve chambers 14a, 14b, 30, 32. In this way, accidental release of fuel by operation of only a single poppet valve is prevented: both poppet valves must be actuated for release of fuel.

As also shown in FIG. 3, the interface cap 24 is mounted onto the upper manifold 20.

The interface seal assembly 23 is mounted onto the support platform 22 and the printed circuit board 25 is mounted onto the upper manifold 20 around the interface seal assembly 23. Both the PCB 25 and the interface seal assembly 23 are retained in place by the rigid engagement plate 9 which is secured using screws into the screw holes 15. The rigid engagement plate 9 preferably has a thickness such that it stands higher than the exposed face 6 of the resilient sealing member 27. Thus, in a general aspect, the portion of the engagement surface 5 that is defined by the resilient sealing member 27 is recessed below a portion of the engagement surface 5 that is defined by the rigid engagement plate.

The lower face 41 of the resilient sealing member 27 thereby creates a fluid tight seal around the fluid flow path chamber 34 and the upper face 40 of the resilient sealing member 27 provides an exposed sealing face for coupling to a fuel consuming apparatus such as a fuel cell assembly. A potential general problem with flat or smooth exposed sealing faces is that any dirt or debris on the otherwise flat or smooth surface can disrupt the seal to a coupled fuel consuming device. Similarly, any damage to a flat or smooth exposed sealing face, e.g. scratches or pitting, can disrupt the seal to a coupled fuel consuming device. This can be particularly problematic with hydrogen fluid seals.

The inventors have established that providing concentric circumferential ridges 43, 44, 45 on the exposed sealing face, i.e. upper face 40, provides a set of sealing zones such that even if one sealing ridge fails by virtue of damage or debris, a fluid tight seal is maintained by the other circumferential ridges. The expression "circumferential" ridges encompasses any ridges defining a length of closed geometric line or curve around the aperture 42, not necessarily being circular in shape. The ridges may be curved, rectangular, rectilinear or other shapes or combinations of shapes defining a length around the aperture 42. The expression "concentric" circumferential ridges is intended to encompass not only circumferential ridges having a common centre, but also any circumferential ridges in which one ridge is wholly contained within another, both surrounding the aperture 42. A preferred number of concentric circumferential ridges 43, 44, 45 on the upper face 40 is three, as shown; however, at least two circumferential ridges are preferred and more than three ridges may be used. Thus, in a preferred arrangement as shown in the drawings, there is provided an inner circumferential ridge 45 and at least two successively larger outer circumferential ridges, where each outer circumferential ridge is circumambient to the inner circumferential ridge.

The cross-sectional profile of the ridges 43, 44, 45 may be any suitable profile for creating a localised seal at the apex of the ridge to a fuel consuming device brought into compressive engagement with the upper face 40. For example, the ridge apex cross-section may be curved or rectangular in profile, and the ridge generally defines a long narrow elevated surface portion of the resilient sealing member 27.

The concentric circumferential ridges 43, 44, 45 preferably all occupy a common plane as shown in the figures. However, it would be possible to modify the arrangement such that not all ridges occupy the same plane provided that a complementary stepped mating surface on a fuel consuming device were adapted to meet each ridge at the appropriate height, to thereby form the appropriate seal with each concentric ridge.

The presence of concentric ridges 51 on the lower face 41 of the resilient sealing member 27 is preferable though may be less important in the sense that this sealing surface is internal to the cartridge 1 and therefore less susceptible to damage and debris. Thus, a flat sealing surface could be used on the lower face 41 if desired.

The flat profile region 50 of the resilient sealing member 27 provides a further peripheral sealing area which is preferably a flat seal. Alternatively, the further peripheral sealing area could be stepped or disposed at an oblique angle such that it presents a frusto-conical surface area.

Figure 6:
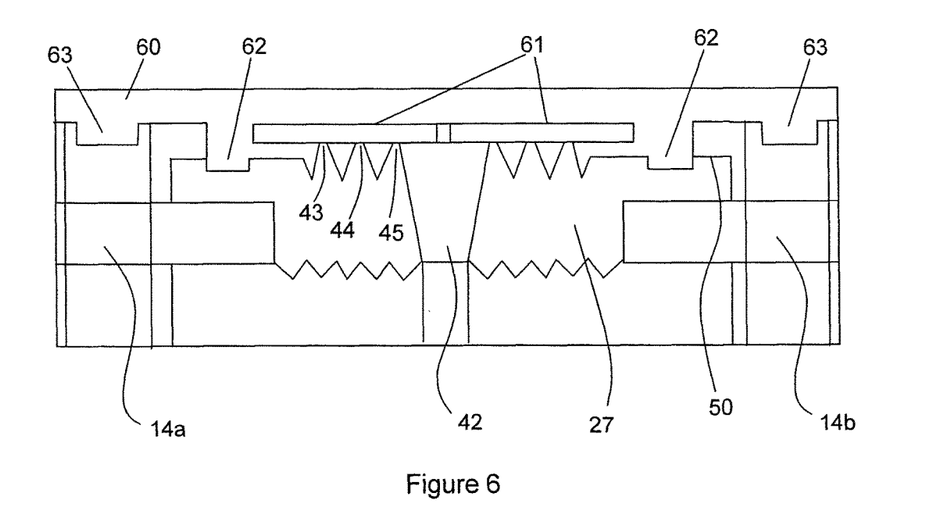
FIG. 6 shows a schematic cross-sectional view of the cartridge header of claim 3 coupled to elements of a fuel cell assembly.

As shown in FIG. 6, a fuel consuming device has a pressure plate 60 which is brought into compression relationship with the resilient sealing member 27. The pressure plate 60 comprises a metal plate portion 61 which comes into contact with the apexes of the concentric circumferential ridges 43, 44, 45 thereby compressing the ridges and forming multiple concentric seals around the aperture 42 approximately in the plane of the ridge apexes (allowing for a small amount of compression). The pressure plate 60 also includes a plastic rim 62 which engages with and slightly compresses the flat profile region 50, forming a further circumferential seal which is peripheral to the circumferential ridges 43, 44, 45. This is a generally flat seal subject to minor localised compression by the rim 62, shown exaggerated in the drawings. This further circumferential/peripheral seal may add stability to the overall compression seal. The flat profile region 50 preferably occupies a different plane than the plane or planes of the apexes of the ridges 43, 44, 45. As shown in FIG. 6, the plane of the flat profile region 50 is preferably below the plane of the apexes of the ridges, thereby producing a compression seal having circumferential seals in two different planes.

As shown in FIG. 6, the pressure plate 60 preferably also includes two nubs 63 or other protuberances which can extend into poppet valve apertures 14a, 14b to actuate the poppet valves.

The resilient sealing member 27 may be fabricated from any suitable material such as an elastomeric material (e.g. EPDM), and preferably any material susceptible of overmoulding and or injection moulding.

Some significant advantages to features of the interface seal described above are notable.

The resilient sealing member 27 can be formed as a unitary component providing both upper and lower sealing faces on upper face 40 and lower face 41. It is preferably located within a rigid frame 26 for manufacturing simplicity and is easily and quickly replaceable when a cartridge is refilled, regenerated or remanufactured. This is important for low cost replenishment or servicing of cartridges. Overmoulding the resilient sealing member 27 into the frame 26 provides an easily replaced unitary structure of an interface seal assembly 23, which may be more convenient and cost effective for routine replacement of the outer sealing surface. The interface seal assembly 23 can easily be integrated into a printed circuit board assembly 25 thereby allowing memory components and electrical connections to be easily replaced each time the cartridge is refilled, regenerated, remanufactured or recycled, by replacement of the entire PCB 25/frame 26/resilient sealing member 27. The expression "reconditioning" is used for convenience herein to encompass all forms of refilling, regeneration, remanufacturing or recycling of a cartridge.

Thus, in a general aspect, a method of reconditioning a fuel cartridge may include the steps of (i) removing the interface seal assembly 23 by detachment of the rigid frame 26 from the cartridge body, e.g. by release of the rigid engagement plate 9; (ii) attaching a new interface seal assembly 23 to the cartridge body/header 2, 3, thereby renewing the seals defined by the upper face 40 and the lower face 41 of the resilient sealing member 27; and (iii) replenishing a fuel source within the fuel cartridge. Step (iii) need not necessarily take place after the interface seal assembly 23 is replaced, since the poppet valves can remain securely closed even when the rigid engagement plate 9 and interface seal assembly are removed from the cartridge header.

If the rigid frame 26 includes or is integral with a circuit board component having electrical contacts thereon, the step of removing the interface seal assembly includes simultaneous removal of electrical contacts coupled thereto and the step of attaching a new interface seal assembly includes simultaneously attaching new electrical contacts.

If the circuit board component contains a memory chip or other electronic components, these can also be replaced and/or reprogrammed at the same time.

The resilient sealing member 27, although easily replaceable, is still securely fitted while presenting an exposed compression surface, and is not susceptible to being detached, unlike many o-ring arrangements. The use of a resilient sealing member 27 overmoulded onto a frame 26 (and possibly a PCB 25) provides a very low cost replaceable part so that the quality of the sealing surface can be easily maintained even in a fuel cartridge whose design life may exceed 500 refill/recharge cycles.

The use of several concentric circumferential ridges as sealing surfaces can reduce the reliance on a single sealing boundary. This in turn means that the resilient sealing material may be made harder, and therefore less prone to damage, than a sealing surface reliant on a single knife edge seal. Alternatively, if a soft resilient material is used with multiple concentric circumferential seals, the compression force required to attach the cartridge 1 to the fuel consuming apparatus may be reduced.

The concentric circumferential ridges 43, 44, 45 may increase stiction forces between the cartridge and the fuel consuming apparatus. Still further, the presence of the channels 46, 47, 48 between the somewhat compressible ridges may provide a suction force when air is expelled from the channels 46, 47, 48 during compression of the sealing surface onto the fuel consuming apparatus pressure plate 60, similar to the operation of a suction cup applied to, e.g. glass, thereby further improving retention forces and resisting disturbance of the seal during vibration, flexing etc.

In portable fuel cell type applications, the concentric circumferential ridges may have diameters in the range 3 to 5 mm but the arrangements described can be made both smaller and larger.

The cartridge design shown in FIGS. 1 to 6 is particularly suited to hydrogen storage cartridges.

Although the resilient sealing member 27 has been shown positioned on the cartridge side of the interface seal, it will be recognised that the resilient sealing member 27 could be disposed on the fuel consuming apparatus, and/or on an intermediate adaptor positioned between the cartridge 1 and a fuel consuming device. In this respect, references to the cartridge or fuel consuming apparatus/fuel cell apparatus may include an intermediate adaptor coupled thereto. More generally, the resilient sealing member 27 can be used at any point in a fluid flow path where separation of two components defining the fluid flow path is required. Furthermore, where multiple fluid flow paths are required across a separation interface, a single resilient sealing member 27 may be provided with multiple apertures 42. Each aperture could be provided with its own set of independent concentric circumferential ridges, when the apertures must maintain separate flow paths, or common independent concentric circumferential ridges when the apertures are defining parallel connected flow paths.

Other embodiments are intentionally within the scope of the accompanying claims.

The invention claimed is:
1. A method of reconditioning a fuel cartridge,
having a body and an interface seal assembly comprising a resilient sealing member moulded onto a rigid frame, the resilient sealing assembly having a first face and a second face and an aperture extending between the first face and the second face, the aperture forming part of a fuel flow path from the cartridge to an external interface defined by the first face, and the second face defining a seal to an internal part of the fuel cartridge, the method comprising the steps of:

removing the interface seal assembly by detachment of the rigid frame from the cartridge body;

attaching a new interface seal assembly to the cartridge body, thereby renewing the seals defined by the first face and the second face of the resilient sealing member; and, replenishing a fuel source within the fuel cartridge.

2. The method of claim 1 in which the rigid frame includes a circuit board component having electrical contacts thereon, wherein the step of removing the interface seal assembly includes simultaneous removal of electrical contacts coupled thereto and the step of attaching a new interface seal assembly includes simultaneously attaching new electrical contacts.

* * * * *